June 24, 1969     D. M. OLSEN     3,451,261

AUTOMOBILE DIAGNOSTIC CENTER

Filed Oct. 31, 1966     Sheet _1_ of 3

INVENTOR.
DICK M. OLSEN
BY Frederick C. Lange
ATTORNEY

June 24, 1969     D. M. OLSEN     3,451,261

AUTOMOBILE DIAGNOSTIC CENTER

Filed Oct. 31, 1966     Sheet 3 of 3

INVENTOR.
DICK M. OLSEN

BY Frederick E. Lange

ATTORNEY

United States Patent Office 3,451,261
Patented June 24, 1969

3,451,261
AUTOMOBILE DIAGNOSTIC CENTER
Dick M. Olsen, Mound, Minn., assignor to Marquette Corporation, Minneapolis, Minn., a corporation of Delaware
Filed Oct. 31, 1966, Ser. No. 590,691
Int. Cl. G01m 15/00
U.S. Cl. 73—117.2                                16 Claims

ABSTRACT OF THE DISCLOSURE

Automobile diagnostic center employing a circular roadway surrounding a central interior structure in which diagnostic stations are disposed along the circular roadway and there are radial repair stalls outside of the circular roadway into which vehicles can be driven from the circular roadway. The circular roadway may extend for only 180 degrees or it may extend substantially 360 degrees.

---

Sophisticated equipment has long been available for use in automotive diagnosis. It has not found wide spread application, however, because its relatively high capital cost requires almost constant use for profitability. In other words, the equipment cannot be justified where a high percentage of "down-time" prevails. The present invention provides an automotive diagnostic center which promotes maximum efficient use of the equipment. It promotes a continuous throughput of automotive vehicles to distribute the capital expenditure represented by the sophisticated automotive diagnostic equipment. Thus higher quality automotive diagnosis is made available to the public at a reasonable cost.

Various systems for continuous diagnosis of automotive vehicles are in use. Most of the systems employ a straight line traffic pattern through the diagnostic land and, in almost all cases, are limited to one roadway width which makes deviation from the lane impractical. Thus, no efficient means is provided for removing a vehicle from the diagnostic lane for repair to reaching the end of the lane. Moreover, the system of the prior art does not provide for customer observation from a single centrally located position and convenient customer observation is highly desirable.

The present invention provides for continuous customer observation from a single observation point. Thus, without traveling with the vehicle as it passes through the diagnostic station, the customer can observe the test activity as well as the results at each station. It also provides for convenient "pull-out" from the diagnostic lane into a repair stall, or out of the system entirely, prior to reaching the end of the diagnostic lane. Thus, an automobile that is too defective to test properly can be removed from the diagnostic lane prematurely for immediate repair or immediate exit from the system without disruption of traffic flow. It provides for convenient location of repair stalls readily accessible from the diagnostic lane. It also provides for a centrally disposed parts department readily accessible by personnel at each station. And the general configuration of the layout as a whole promotes efficient air circulation which is important to adequately deal with exhaust fumes.

Accordingly, it is an object of the present invention to provide a continuous system for automotive diagnosis which has maximum efficiency of traffic flow for diagnosis and repair.

It is a further object to provide a continuous system for for automotive diagnosis which includes a centrally located parts department for maximum convenience to the users thereof.

It is a further object to provide a continuous system for automotive diagnosis which insures maximum customer observation from a single centralized location.

It is the further object to provide a layout for automotive diagnosis and repair which includes a plurality of radially disposed repair stalls spaced outwardly from a regularly curved roadway to thereby allow exit or removal of automobiles from the diagnostic lane for repair without disruption of traffic flow.

It is also an object of the present invention to provide for customer observation of the test results or output from the automotive diagnostic equipment at a single centralized customer observation area.

And a further object of the invention is to provide an automotive diagnostic center which includes an intermediate or secondary lane, in addition to the primary diagnostic lane, which provides for performance of vehicle tests required by governmental legislation.

Each of the above objects is fulfilled by the specific form of the invention shown in the drawings wherein:

FIGURE 1 is a plan view of a semi-circular automotive diagnostic system with the roof of the exterior structure removed. The view shows the centrally located interior structure which houses a central observation area and a parts department. It also shows the semi-circular diagnostic lane or roadway with five diagnostic stations, a secondary inspection lane or roadway with a plurality of inspection stations, a plurality of radially disposed repair stalls, and the general traffic flow pattern.

In general, the present invention comprises a walled interior structure; a regularly curved roadway extending concentrically around the interior structure; automotive diagnostic equipment circumferentially spaced on the roadway thereby defining a number of diagnostic stations; a number of radially disposed repair stalls spaced outwardly from the roadway; and an exterior structure enclosing the interior structure, the roadway, and the repair stalls, and defining the entrance and exit to the roadway. Means is provided for transmitting the output of the diagnostic equipment to points visible within the walled interior structure for customer observation.

Figure 5:
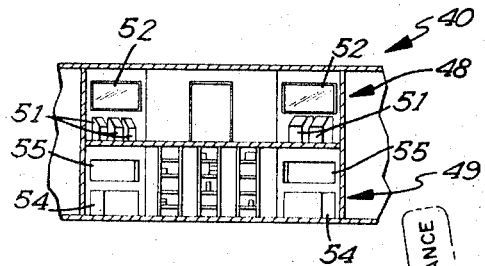
FIGURE 5 is a sectional view taken on the line 5—5 of FIGURE 4 and shows the two-story centrally located customer observation lounge and parts department.

Two forms of the invention are shown. One form, shown in FIGURES 1–3 and 6, is characterized by a semi-circular roadway having an entrance and an exit angularly spaced approximately 180 degrees. The second form of the invention, shown in FIGURES 4 and 5, is characterized by a circular roadway which extends an angular distance of approximately 350 degrees from entrance to exit.

Figure 1:
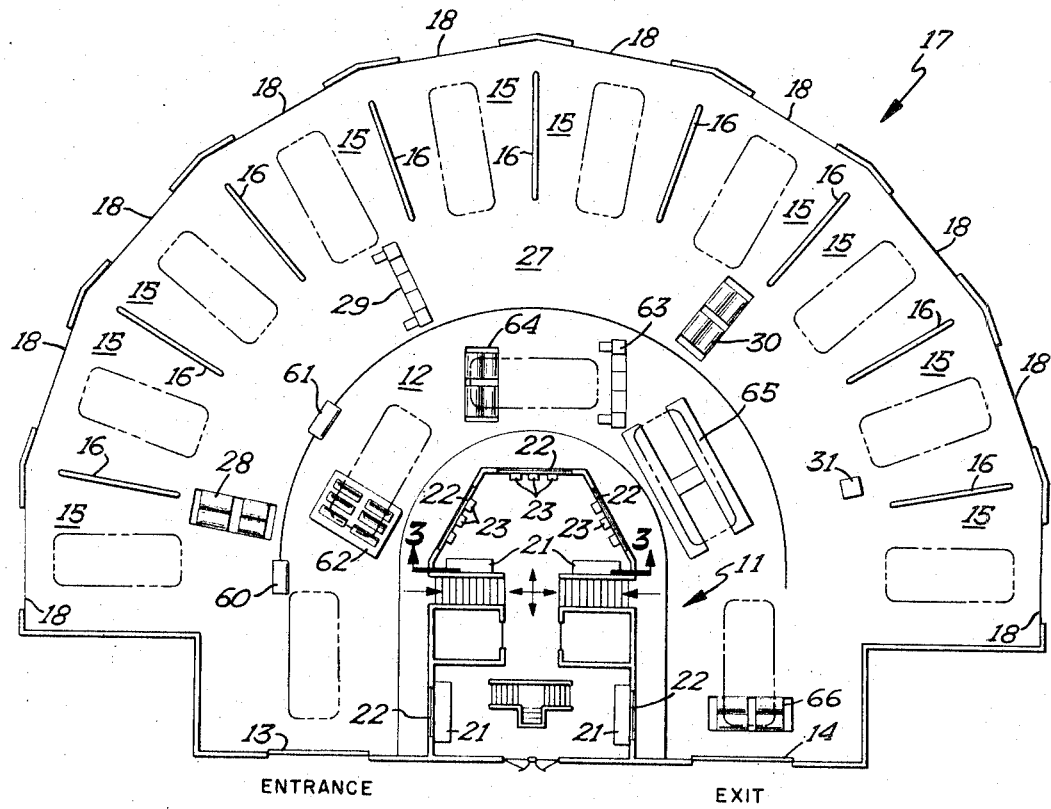
Figure 2:
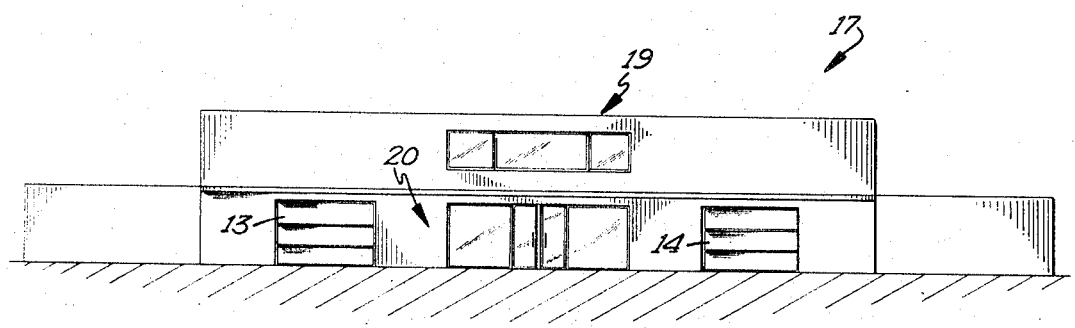
FIGURE 2 is a front elevational view of the structure of FIGURE 1 and shows the diagnostic lane entrance and exit doors as well as the customer exit and entrance doors.
Figure 3:
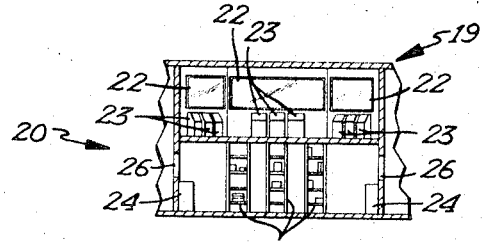
FIGURE 3 is a sectional view taken on the line 3—3 of FIGURE 1 and shows the two-story interior structure with the customer observation lounge on the second floor and the parts department on the first floor.
Figure 4:
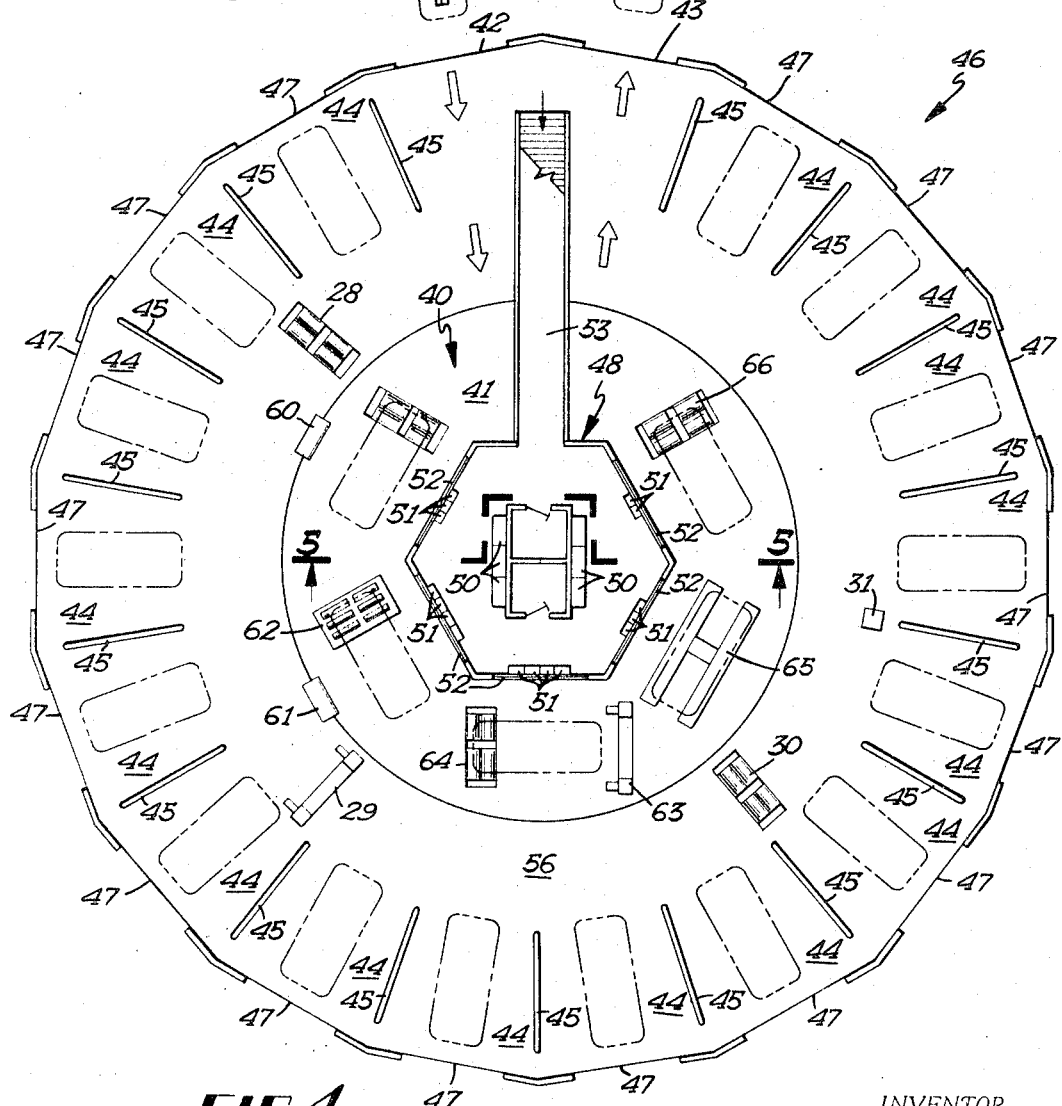
FIGURE 4 is a plan view (roof removed) of a circular automotive diagnostic system, as distinguished from the semi-circular layout of FIGURES 1–3.

The semi-circular form of the invention is shown primarily in FIGURES 1–3. With reference to FIGURE 1, the automotive diagnostic center includes, in general, a walled interior structure 11, and a semi-circular diagnostic lane or roadway 12 extending around the interior structure 11 from the entrance thereto at door 13 to the exit therefrom at door 14. A plurality of stalls 15 is radially disposed and spaced outwardly from interior structure 11. Stalls 15 are defined by radially extending partitions 16 which may also serve as a means for mounting shelves, tools, and other repair equipment used for repairing the automotive vehicles undergoing diagnosis and repair. A semi-circular exterior structure 17 completely encloses the interior structure 11, the roadway 12, and the repair stalls 15. External structure 17 may define an exit 18 spaced outwardly from and associated with each stall 15. Stalls 15 are spaced a sufficient distance from the diagnostic lane or roadway between entrance 13 and exit 14, to provide room for an additional semi-circular roadway 27 in which additional tests, such as those required by various vehicle inspection laws, can be made if desired by the specific installation.

In general, a vehicle, V, enters the center at entrance 13 and undergoes a series of tests at each of five diagnostic stations along the roadway 12. The test results are noted and recorded by the diagnostician at each station and are transmitted into the customer lounge and observation area for simultaneous observation on remote consoles which duplicate the readings on the diagnostic equipment at each station. Vehicles needing repair may be conveniently and efficiently removed from the diagnostic lane 12 and driven into any one of the stalls 15 if immediate repair is necessary and desired.

With reference primarily to FIGURES 1 and 3, walled interior structure 11, includes an upper story 19 and a lower story 20. Upper story 19 includes a customer lounge and observation area. Accordingly, furniture 21 may be provided as well as additional items normally found in a lounging area. Upper story 19 is provided with observation windows 22 which have substantially 180 degree exposure so that customers can observe the test activity as their particular vehicle undergoes diagnosis. Observation of the specific test results showing the output of the various diagnostic equipment used to make the tests, can be observed by means of remote consoles 23 which are placed in the observation area. Interior structure 11 is preferably of polygonal form with a wall and window exposed to each testing station.

The lower story 20 of the interior structure 11, includes a number of counters 24 as well as shelving 25. A parts inventory is kept on shelves 25 and dispensed through windows 26 as required.

Automotive diagnostic equipment is circumferentially spaced on the diagnostic lane 12 to define five diagnostic stations. The specific equipment and tests made at each station are described in detail below.

A secondary inspection lane 27 is provided for performing tests required by vehicle inspection laws. While the test equipment placed in secondary inspection lane 27 may vary considerably, the lane may typically include brake tester 28, head light alignment tester 29, a dynamic alignment machine 30, and an exhaust analyzer 31.

The circular form of the invention, shown in FIGURES 4 and 5, includes a centrally located interior structure 40, a circular roadway or diagnostic lane 41 extending around central structure 40, an entrance 42, an axit 43, and a series of radially disposed stalls 44 defined by partitions 45. Exterior structure 46 acts as an enclosure and may define an exit 47 associated with each stall 44.

Like the central structure 11 of FIGURES 1 and 3, interior structure 40, shown in FIGURE 5, is preferably polygonal in form and includes an upper story 48 and a lower story 49. Upper story 48 is provided with furniture 50 and remote consoles 51. Observation windows 52 provide for 360 degree observation of the diagnostic lane. A stairs or escalator 53 leads from the customer entrance at ground level to the customer observation lounge above.

A parts department is provided in the lower story 49 of interior structure 40, and, like the parts department previously described, includes counters 54 and windows 55.

Diagnostic equipment is circumferentially spaced in the circular diagnostic lane 41 to define five diagnostic stations, similar to the diagnostic stations of the semi-circular form of the invention described above.

While the central interior structures 11 and 40, shown in each form of the invention include an upper and lower story (see FIGURES 3 and 5), the structure may be designed with but one story. In the case of the semi-circular form of the invention shown in FIGURES 1–3, when central interior structure 11 is designed with but one story, the inner half thereof is devoted to a customer lounge and observation area while the outer half thereof, i.e., the half adjacent the portion of exterior structure 17 between entrance 13 and exit 14, is devoted to a parts department. Thus, both customer observation and parts access is provided from one centralized location with a one-story structure and 180 degree exposure to the test stations is maintained. In the case of the circular form of the invention, interior structure 40 may be designed with one story with the center or inner portion thereof devoted to a parts department and with the outer portion devoted to a customer lounge and observation area.

A secondary inspection lane 56 is provided concentrically with and spaced outwardly from diagnostic lane 41 for use in performing tests required by various legislation. Thus secondary lane 56 is similar to secondary inspection lane 27 described above and typically includes similar test equipment as shown.

In the case of both embodiments shown and described, sound absorbent materials should be used in the walls and ceilings of the interior and exterior structures to reduce the noise level to a point not objectionable to operating personnel and customers. A number of tests are performed with the vehicle operating at full throttle under a load on a dynamometer. Accordingly, the noise level can be very high within the exterior structure 17 or 36 and sound absorbent materials are highly desirable. Thermoglass may be used in windows 22 and 42 to provide additional sound protection between the diagnostic lane and the customers in the observation lounge.

The diagnostic lane should be entirely closed from the customer observation lounge to prevent customer interference with the diagnosis. Customer observation is provided for only from the customer observation lounge.

Doors at either end of the diagnostic lane should be the overhead type, power driven and either manually or automatically operated.

Adequate fire protection should be provided in the diagnostic lane. Dry chemical extinguishers should be provided on each side of the lane as a minimum requirement.

The width of the diagnostic lane may vary from a minimum width of 16 feet to a comfortable width of 20 feet. The lane width may be chosen as a function of the space available, the disposition of the diagnostic equipment and the size of the vehicles to be diagnosed.

The diagnostic lane floor should be designed to support a vehicle weight of at least twice the capacity of the dynamometer selected. Present passenger car dynamometers are capable of supporting 4200 pounds axle loading which can accommodate vehicle up to 8400 pounds total weight. The lane floor should therefore be designed to support a vehicle weight of approximately 16,800 pounds. In some cases reinforced concrete may be required depending upon soil conditions beneath the structure. Under normal soil conditions, a six-inch reinforced slab is generally suggested for all applications to support passenger vehicles. The concrete floor of the system should be surfaced hardened as well as colored.

The vehicles operating under load at high speed on the dynamometer generate significant quantity of carbon monoxide which must be conducted out of the diagnostic lane and exterior structure. A conventional exhaust evacuation system may be provided to conduct exhaust gas directly from the vehicle tail pipe to the atmosphere. Make-up air should be provided in a quantity which exceeds the quantity of air exhausted from the exterior structure by at least 10 percent. Atmospheric air should be introduced into the exterior structure at the rate of 10 to 15 air changes per hour.

Since a substantial amount of the work done in the diagnostic lane is vehicle inspection, the general lighting should be greater than 200 foot candles when measured at a point 3 feet above the floor level. Lighting should be concentrated and centered over the diagnostic lane and adjustable spotlights may be provided for use in under hood and under chassis inspection.

Five diagnostic stations are provided in the primary diagnostic lanes 12 and 41 of each of the illustrated embodiments, although the specific number of stations may vary and five is not critical. The following is a typical five station arrangement. The equipment including tools, as well as the items tested at each station is shown below.

STATION ONE—PREPARATION

| Equipment | Tools | Items tested |
|---|---|---|
| One automotive electrical system diagnostic console, two flush mounted air reels, one flush mounted water reel, one air filter tester, two oil analyzers, and one overhead drop cord with automatic reel. | Flashlight, antifreeze tester, belt tension gauge, oil can pouring spout, transmission oil pouring funnel, blotter paper for transmission oil test, automotive stethoscope, air conditioner tester, P.C.V. tester, portable car start, jumper wire, radiator and radiator cap pressure tester, 10″ adjustable wrench. | Horn, radio, heater and defroster, air conditioner, power windows, power seats, power antenna, indicator lights and/or gauges, neutral safety switch, transmission selector alignment, rear view and side mirrors, all glass, hood latch, transmission fluid level and condition (automatic transmission), coolant level and condition, positive crankcase ventilation, radiator, all hoses, radiator cap, all belts, brake fluid level, master cylinder leaks, battery electrolyte level, windshield washer fluid level, air filter, choke operation, cranking system (including cranking voltage at coil, cranking voltage at battery, starter draw, and cable resistance), charging system (generator or alternator output and regulated voltage), battery condition, length of generator brushers (if visible), windshield washer operation, and windshield wiper operation. |

STATION TWO—POWER ANALYSIS

| Equipment | Tools | Items tested |
|---|---|---|
| One performance diagnostic console, a chassis dynamometer (flush mounted), combustion analyzer, hydro-carbon emission analyzer, flush mounted water reel, and flush mounted air reel. | 10″ adjustable wrench, side cutter, pliers, flashlight, hex wrenches, fuel pump tester, combination open-box end wrenches, water pump pliers, needle nose pliers, tubing wrenches, screw drivers, carburetor and distributor flexible adjusting tool, grounding tool for rotor gap test vacuum hose adapters, sparkplug test wire, coil test wire, automotive stethoscope, combustion leak tester. | Ballast resistor condition, points resistance test, point condition, dwell, condenser, coil, distrubitor mechanical condition, coil polarity, basic timing, centrifugal advance operation, total advance at 2,000 r.p.m., rotor gap, transmission test (including low range acceleration, shift points, forced downshift), clutch operation and condition, speedometer accuracy on rear wheel-driven speedometers, hydro-carbon emission test, drive line vibrations and/or noise, idle mixture, idle r.p.m., cruising mixture, maximum coil output, accelerator pump operation, full throttle mixture, power valve operation, maximum road horsepower and/or torque, sparkplug condition, high tension wire condition, fuel system test, power check (internal condition of engine), combustion leakage. |

STATION THREE—BRAKE AND LIGHT TESTING

| Equipment | Tools | Items tested |
|---|---|---|
| Dynamic brake tester, headlight alignment tester, light intensity meter, convex mirror, flush mounted air reel, flush mounted water reel. | | Static brake test, emergency brake, front brake effort, front brake balance, front brake fade, front wheel vibrations, speedometer accuracy on front wheel driven speedometers, rear brake effort, rear brake balance, rear brake fade, rear wheel vibrations, all light operation (including, headlights, parking lights, turn lights, stop lights, tail lights, back-up lights, interior lights, instrument lights, and license plate lights), headlight alignment, headlight candle power. |

STATION FOUR—VISUAL INSPECTION

| Equipment | Tools | Items tested |
|---|---|---|
| Twin post hoist (full hydraulic), front end hoist (full hydraulic), flush mounted air reels, flush mounted water reel, overhead H.D. dropcord with automatic reel. | Hub cap and grease cap puller, rubber mallet, side cutter pliers, adjustable wrench, brake drum micrometer, brake lining gauge, inch-pounds torque wrench with pointer gauge, socket wrenches, mechanic's brake stool on casters, pry bar, flashlight, air impact wrench, automotive stethoscope, hex wrench, tire tread depth gauges (4). | Trunk latch, spare tire condition, trunk tools, tire condition, gas tank, rear springs, rear shock absorbers, differential leaks, differential fluid level, rear universal joint, emergency brake cable, tail pipe(s), muffler(s), center universal joint and support bearing, all fluid lines, transmission fluid level (standard transmission), transmission leaks, transmission linkage, engine and transmission mounts, manifold heat valve, exhaust pipe(s), all rubber bushings in front suspension, steering idler arm, tie-rod ends, front shock absorbers, front springs, freeze plugs (engine and transmission), engine oil leaks, right front wheel bearing, right front wheel cylinder, right front brake drum, right front brake springs, right front brake lining, ball joints and/or king pins, control arms and bushings, steering gear adjustment. |

STATION FIVE—ALIGNMENT

| Equipment | Tools | Items tested |
|---|---|---|
| Dynamic alignment machine, flush mounted air reel, flush mounted water reel. | Flashlight, automotive stethoscope. | Toe-in, right camber, left camber, right caster, left caster, right front wheel run-out, left front wheel run-out, frame track, rear wheel toe-in, right rear camber, left rear camber, right rear wheel run-out, left rear wheel run-out. |

With references to FIGURES 1 and 4, Station One is characterized by electrical system console 60. Station Two is characterized by performance console 61 and dynamometer 62. Station Three is characterized by headlight alignment tester 63 and brake tester 64, while Stations Four and Five are characterized by a hoist 65 and dynamic alignment machine 66, respectively. While the automotive diagnostic equipment placed at each of the stations may vary in specific design and character, the major items placed at each of the stations in the illustrated embodiment are described more particularly below.

Station One is characterized by electrical system diagnositc console 60 which is an ignition analyzer and includes a plurality of meters and lights for indicating battery voltage and condition. More particularly, console 60 includes three lights for indicating battery condition, a voltmeter for measuring battery voltage, a volt meter for measuring ignition voltage, a cathode ray oscilloscope, a tachometer and an ammeter. Leads are provided for connecting the diagnostic console 60 with the automotive engine for testing the ignition system, the battery, condenser, points, distributor, coils, the high tension circuit insulation, the high tension plug circuit, and the spark plugs.

Station Two is characterized by performance console 61 and dynamometer 62. Performance console 61 is an ignition analyzer, like electrical system diagnostic console 60, and, in addition, includes equipment which cooperates with dynamometer 62 to measure engine speed and power. Provision is made for selectively shorting out spark plugs to thereby affect engine power. Console 61 includes a three-range tachometer, a volt meter, a cathode ray oscilloscope, an air-fuel ratio indicator (which responds to thermoconductivity of the air-fuel mixture), an ignition timing advance meter, and a high speed power check system which includes an individual cylinder output scale. Thus performance console 61 is capable of diagnosing the automotive engine for defects stemming from the following fundamental elements of proper engine operation: compression, vacuum, primary and secondary ignition, and carburetion.

Both electrical system diagnostic console 60 and performance console 61 are track mounted and suspended from a point well above the height of the automotive vehicles undergoing diagnosis. Thus, both of the consoles may be conveniently moved both parallel to and perpendicular to the path of the vehicle being tested to thereby locate the console at the front side or rear of the vehicle.

Both electrical system console 60 and performance console 61 are available from Marquette Corporation, Minneapolis, Minn.

Dynamometer 62 has two pair of rollers, one pair serving the right rear wheel and the other pair serving the left rear wheel. Each pair of rollers is provided with a rotational drag to thereby load the rear wheels of the automotive vehicle under test as the wheels engage and drive the rollers. The torque or drag on the dynamometer rollers is measured and combined with the tachometer reading of performance console 62 to yield an indication of engine power delivered by the rear wheels. Performance console 61 is accordingly closely associated with dynamometer 62.

A suitable dynamometer is available from the Clayton Manufacturing Company, El Monte, Calif.

The dynamic brake tester 64 of Station Three includes two pair or parallel spaced rollers for engaging the right and left wheels (both front and rear) of the automotive vehicle. Each pair consists of an idler roller and a driven roller. The driven roller in each pair is drivingly connected to a cradle-mounted 20 horsepower electric motor. Each motor is provided with a torque arm extending perpendicularly from its drive shaft and means is provided to measure the force transmitted by the torque arm when the motor is turning the driven roller and a tire is in engagement with the pair of rollers. The torque or force on the torque arm, accordingly, provides an indication of wheel drag when the brakes are not applied and an indication of braking resistance when the brake is applied. Means of the pneumatic-null type is provided for recording the pressure required to balance the torque arm when each wheel is braked during rotation thereof. Thus, a measurement of the braking balance as well as the braking or rolling resistance is obtained.

A suitable dynamic brake tester is available from Clayton Manufacturing Company, El Monte, Calif.

The headlight alignment tester 63 of Station Three includes means for measuring beam aim and candle power. For that purpose a photoelectric cell and candle power meter are provided. Headlight aim is determined by vertically and horizontally adjusting the position of the alignment tester by means of vertical and side aim dials until the highest candle power reading is obtained. Headlight aim is corrected by setting dials to desired aim and repositioning the headlight until the highest candle power reading is obtained.

A suitable headlight alignment tester is available from Weaver Division of Dura Corporation, Sprinfield, Ill.

Station Four is characterized by conventional hoist 65.

The dynamic wheel alignment machine 66, which characterizes Station Five, provides for measurement of the caster and camber of the right and left front wheels, and the total toe-in of the front wheel. For that purpose two pair of rollers is provided for simultaneous engagement by the two front wheels, respectively. Each pair of rollers includes a driven roller for spinning the wheel in engagement therewith. Each pair of rollers is carriage mounted on parallel axes and each carriage is hydraulically adjustable (in a manner described more particularly below) about both a horizontal and vertical axis to align the rollers with their axes of rotation parallel to the axis of rotation of the front wheel in engagement therewith. For that purpose each carriage is provided with a hydraulic system controlled by a precision snap switch and servo unit. The precision snap switches are actuated by axial movement of the rollers, which initially occurs as they are rotated in engagement with the wheel. Initial contact between the wheel and the rollers is made with the axes of the rollers askew with respect to the axis of the wheel. Rotation of the wheel in engagement with the roller accordingly drives the rollers axially. Precision snap switches positioned on each side of the rollers control the servo unit which hydraulically adjusts the position of the carriage (about both a horizontal and vertical axis) to compensate for the axial force applied to the roller by the spinning wheel. The servo unit continues to adjust the position of the carriage until all side (or axial) forces on the rollers are eliminated. At that point, the axes of the rollers are parallel with the axis of the wheel in engagement therewith. Accordingly, wheel camber and toe-in can be determined. A pair of potentiometers, adjusted by the movement of the roller carriage, provide an output which represents the angle between the roller axis and an intersecting verticle axis (camber). The second potentiometer reflects the pivoting of the two roller carriages about a vertical axis. Accordingly, it indicates total toe-in.

To obtain the caster of a vehicle wheel, the wheels are turned seven and one-half degrees to the right and seven and one-half degrees to the left while in alignment with and being rotated by a pair of rollers. Caster is the difference in the camber of the wheels when turned through 15 degrees, seven and one-half degrees to the right and seven and one-half degrees to the left of straight ahead. Accordingly, means is provided for storing the output of the camber potentiometer at both the seven and one-half degree right and left wheel position. The difference between the two outputs is amplified and represents caster. The operation is performed on each front wheel simultaneously to thereby yield a caster indication for each front wheel with one operation.

It should be noted that means is provided for maintaining the vehicle in a fixed lateral position during the alignment testing described above. Such means includes laterally adjustable supports which engage opposite sides of the vehicle at the front bumper to maintain the vehicle in a fixed position laterally.

A suitable dynamic wheel alignment machine is available from Merrill Engineering Company, Denver, Colo.

Figure 6:
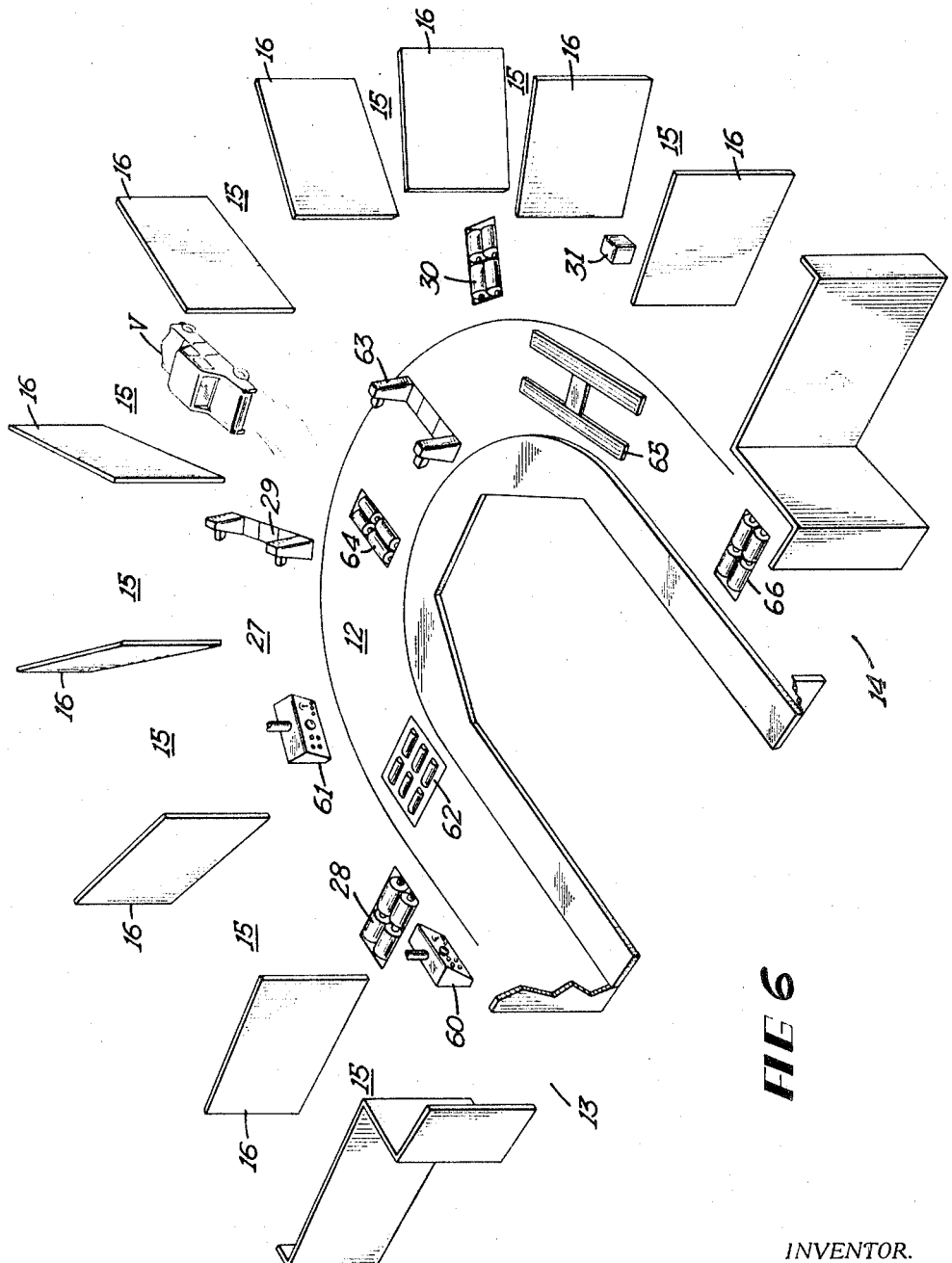
FIGURE 6 is a perspective view of the semi-circular form of the present invention with the central interior structure and the exterior structure removed to show traffic flow through the diagnostic lane, and from the diagnostic lane into the repair stalls.

In the form of the invention, shown in FIGURES 1–3 and 6, vehicles may enter at entrance 13 and pass progressively from station to station through diagnostic lane 12. At each station the tests indicated above are made. Test results are transmitted to the customer lounge area through the provision of remote consoles 23. In the event that immediate vehicle repair is necessary to continue testing, or if immediate repair of a defective item is desired by the customer, vehicle V, may conveniently and smoothly exit from diagnostic lane 12 and enter one of the stalls 15 for repair, as shown in FIGURE 6. Thus, there is no disruption in the flow of vehicles through the diagnostic lane. After repairs are completed, the vehicle may either exit from the diagnostic center at exit 18 associated with the stall 15 or it may return to the diagnostic lane for continued testing. In the event that the secondary lane 27 is desired for testing, vehicles may enter through entrance 13, progress through secondary lane 27, and exit at exit 14.

During the testing described above, customers occupying upper story 19 of exterior structure 11 may observe test activity at each station as well as observe test results on remote consoles 23. During repair, parts may be conveniently obtained from a centrally disposed parts department located on the lower story 20 of interior structure 11.

The operation of the form of the invention shown in FIGURES 4 and 5 is similar to that shown in FIGURES 1–3. Vehicles enter at entrance 42 and progress from station to station and eventually exit at exit 43. Immediate repair may be accomplished through the use of radially disposed stalls 44. Customer observation of test activity during diagnosis is provided from windows 52 of upper story 48 of interior structure 40 and test results may be observed on remote consoles 51. Parts may be conveniently obtained from lower story 49 of central interior structure 40.

The invention thus provides a continuous system for automotive diagnosis which has maximum efficiency and traffic flow for both diagnosis and repair. Moreover, the invention provides for maximum customer observation of both test activity and test results from a single centralized location.

Various changes may be made in the illustrated forms of the invention without departing from its scope. The number of stations may vary and the particular equipment placed at each station may also vary. Other changes in the details, arrangements, disposition of elements, which have been herein described and illustrated to explain the invention, may be made by those skilled in the art without departing from the scope of the invention as defined in the appended claims.

Having thus described the invention, the following is claimed:

1. An automotive diagnostic center comprising:
a walled interior structure;
a regularly curved roadway extending concentrically around said interior structure;
automotive diagnostic equipment circumferentially spaced on said roadway to thereby define a plurality of diagnostic stations;
a plurality of radially disposed repair stalls spaced outwardly from said roadway a sufficient distance to enable a vehicle to turn from said roadway into a selected stall; and
an exterior structure enclosing said interior structure, said regularly curved roadway, and said stalls and defining an entrance and an exit at opposite ends of said roadway.

2. The automotive diagnostic center of claim 1 wherein said interior structure defines a plurality of windows exposed to said plurality of diagnostic stations.

3. The automotive diagnostic center of claim 2 and means for transmitting the output of said automotive diagnostic equipment to points visible within said walled interior structure for observation therein.

4. The automotive diagnostic center of claim 1 and means for transmitting the output of said automotive diagnostic equipment to points visible within said walled interior structure for observation therein.

5. The automotive diagnostic center of claim 4 wherein said interior structure is of polygonal form with the sides thereof corresponding in number to said plurality of diagnostic stations and each of said sides being exposed to one of said stations.

6. The automotive diagnostic center of claim 1 wherein said exterior structure further defines a plurality of exits associated respectively with said stalls so that a vehicle being repaired may be driven outside of said exterior structure without re-entering said roadway.

7. The automotive diagnostic center of claim 1 wherein said walled interior structure includes an upper and lower story, said upper story including a customer lounge and observation area and said lower story including a parts department.

8. In the automotive diagnostic center of claim 1 wherein said regularly curved roadway with said automotive diagnostic equipment circumferentially spaced thereon defines a primary automotive diagnostic lane, a secondary automotive diagnostic lane extending concentrically around said interior structure and disposed outwardly from said primary diagnostic lane and inwardly from said stalls, and automotive diagnostic equipment circumferentially spaced on said secondary diagnostic lane to thereby define a plurality of inspection stations.

9. The automotive diagnostic center of claim 1 wherein said roadway is semi-circular, extending concentrically around said interior structure an angular distance of about 180 degrees.

10. The automotive diagnostic center of claim 9 wherein said interior structure defines a plurality of windows having substantially 180 degree exposure to said 180 degree roadway.

11. The automotive diagnostic center of claim 1 wherein said regularly curved roadway extends concentrically around said interior structure an angular distance greater than 350 degrees.

12. The automotive diagnostic center of claim 11 wherein said interior structure defines a plurality of windows having substantially 350 degree exposure to said 350 degree roadway.

13. The automotive diagnostic center of claim 1 wherein said interior structure is of polygonal form with the sides thereof respectively exposed to said plurality of diagnostic stations.

14. The automotive diagnostic center of claim 1 wherein said exterior structure further defines a plurality of exits associated respectively with said stalls.

15. The automotive diagnostic center of claim 1 wherein said walled interior structure includes an upper and lower story, said upper story including a customer lounge and observation area and said lower story including a parts department.

16. In the automotive diagnostic center of claim wherein said regularly curved roadway with said automotive diagnostic equipment circumferentially spaced thereon defines a primary automotive diagnostic lane, a secondary automotive diagnostic lane extending concentrically around said interior structure and disposed outwardly from said primary diagnostic lane and inwardly from said stalls, and automotive diagnostic equipment circumferentially spaced on said secondary diagnostic lane to thereby define a plurality of inspection stations.

References Cited

UNITED STATES PATENTS 3,354,707    11/1967    Born _____ 73—117
3,238,771    3/1966    Myrtetus et al. _____ 73—117

OTHER REFERENCES

Motor Age, December 1962, p. 46, TL1M88.
Motor Age, December 1963, pp. 46–49, TL1M88.
Motor Age, July 1963, pp. 42, 43, 124, 128, TL1M88.

RICHARD C. QUEISSER, *Primary Examiner.*
JERRY W. MYRACLE, *Assistant Examiner.*

U.S. Cl. X.R.
52—174